United States Patent [19]

Mifsud

[11] 4,014,403

[45] Mar. 29, 1977

[54] VIBRATORY APPARATUS FOR USE IN SEISMIC EXPLORATION

[75] Inventor: Joseph F. Mifsud, Houston, Tex.

[73] Assignee: Exxon Production Research Company, Houston, Tex.

[22] Filed: Apr. 14, 1975

[21] Appl. No.: 567,918

Related U.S. Application Data

[63] Continuation-in-part of Ser. No. 415,095, Nov. 12, 1973, abandoned.

[52] U.S. Cl. ............................... 181/114; 181/119; 181/121; 181/142; 181/401; 340/17 R
[51] Int. Cl.² ......................................... G01V 1/04
[58] Field of Search .......... 181/114, 119, 121, 142, 181/401; 73/67.1, 67.6; 324/83 FR, 83 FM; 340/10, 15, 17, 17 R

[56] References Cited

UNITED STATES PATENTS

| | | | |
|---|---|---|---|
| 3,106,982 | 10/1963 | Wade | 181/114 |
| 3,363,720 | 1/1968 | Mifsud et al. | 181/401 |
| 3,373,841 | 3/1968 | Miller | 181/119 |
| 3,578,102 | 5/1971 | Ross | 181/401 |

*Primary Examiner*—Leland A. Sebastian
*Attorney, Agent, or Firm*—E. Eugene Thigpen

[57] ABSTRACT

In a variable frequency seismic vibrator including an earth coupling plate, means for generating a reaction impedance, and an energy source for generating reciprocating movement of the coupling plate relative to the reaction impedance, the reaction impedance is generated by a reaction mass and a spring of variable stiffness which couples the reaction mass to the vibrator. As the frequency of vibration changes, the stiffness of the spring is automatically adjusted so that the impedance of the spring resonates with the impedance of the mass to maximize the reaction impedance, thereby increasing the operating efficiency of the vibrator.

15 Claims, 6 Drawing Figures

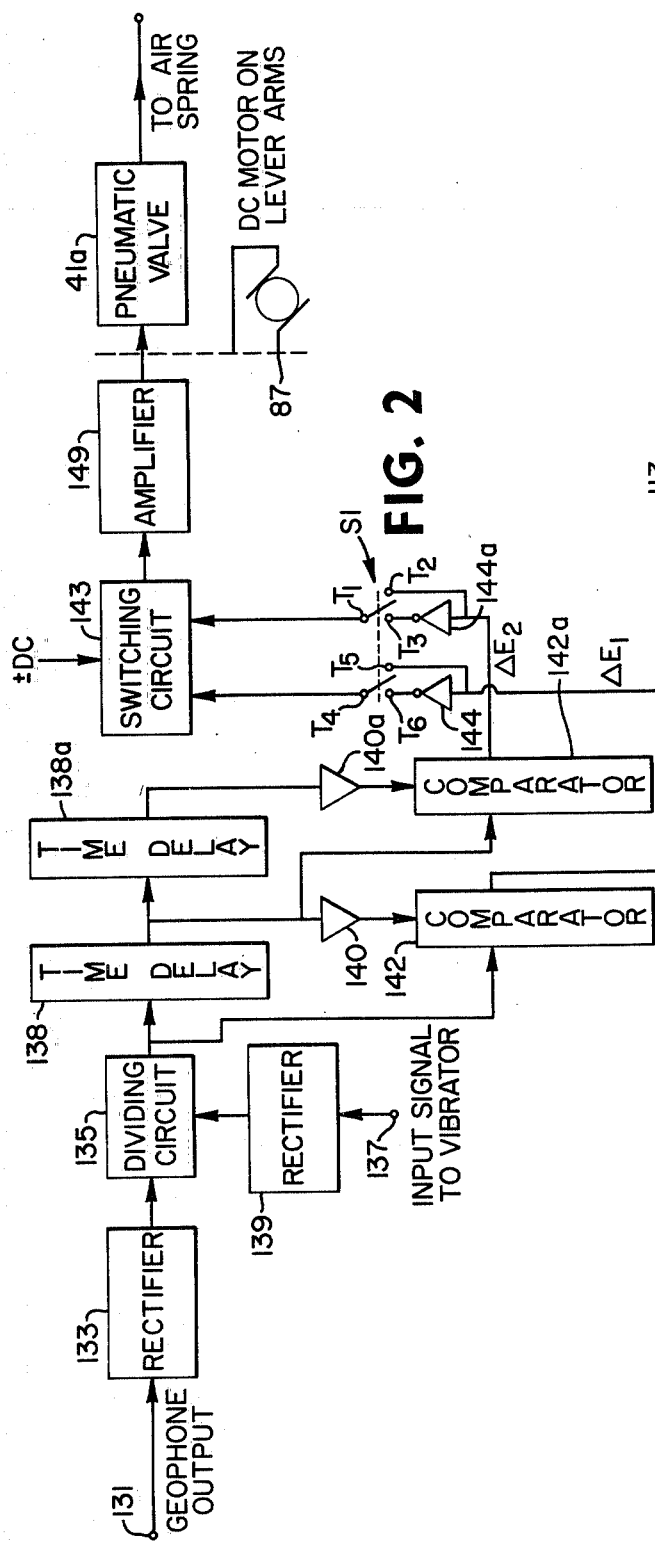
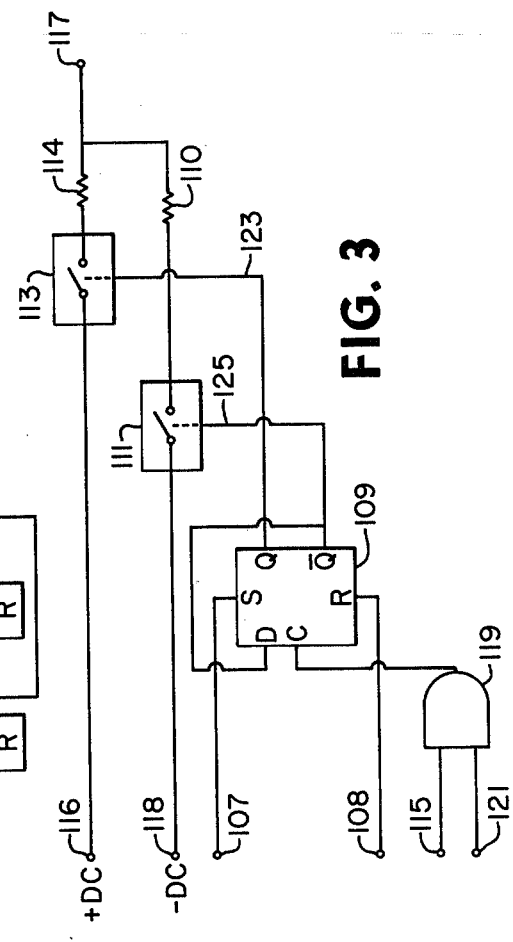
FIG. 2
FIG. 3

4,014,403

VIBRATORY APPARATUS FOR USE IN SEISMIC EXPLORATION

CROSS-REFERENCE TO RELATED APPLICATIONS

This application is a continuation-in-part of U.S. Pat. application Ser. No. 415,095, filed Nov. 12, 1973, now abandoned.

BACKGROUND OF THE INVENTION

1. Field of the Invention

This invention relates generally to seismic prospecting and more particularly to apparatus for imparting variable frequency seismic energy to the earth.

2. Description of the Prior Art

Seismic vibrators normally comprise a vibratory prime mover, a coupling plate for coupling vibratory energy to the earth, a hold down mass for holding the coupling plate in contact with the earth during vibrations, and a reaction mass for generating a reaction impedance so that the vibratory energy produced by the prime mover will move the ground rather than the vibrator. Typically, the vibratory prime mover is a piston and cylinder mechanism, with the coupling plate attached to the piston and a reaction mass connected to the cylinder.

One of the main problems in seismic prospecting with a vibrator is the difficulty in generating a large reaction impedance. The usual way of generating a large reaction impedance is to use a large mass. However a large mass is unwieldy and hard to transport. The impedance of a mass also decreases with decreasing frequency making it particularly difficult to develop a large reaction impedance using only mass at low frequencies.

SUMMARY OF THE INVENTION

In a seismic vibrator, a large reaction impedance is generated utilizing a relatively small reaction mass.

In a preferred embodiment of the invention, a piston and cylinder mechanism is utilized as a seismic energy source. Seismic energy is imparted into the ground by means of a coupling plate that is connected to the piston. Seismic vibrations are produced by reciprocating the piston within the cylinder.

For the system to operate efficiently, the mechanical impedance of the cylinder must be larger than that of the piston. Briefly, the invention in one embodiment involves the coupling of a reaction mass to the cylinder by means of a spring having a variable spring constant.

At any given frequency the stiffness of the spring is adjusted to that the impedance presented to the vibrator by the spring and reaction mass is substantially at resonance. As the vibrating frequency is varied, the stiffness of the spring is varied to maintain the spring and reaction mass substantially at resonant impedance. In a preferred embodiment of the invention, the change in stiffness is accomplished by detecting cylinder motion and automatically adjusting the spring stiffness so that under a given set of operating conditions, cylinder motion is minimized.

BRIEF DESCRIPTION OF THE DRAWINGS

In the drawings:

FIG. 2 is a block diagram of an electrical control system for controlling certain of the components of the embodiments of FIGS. 1 and 1A;

FIG. 3 is a schematic diagram of a switching circuit suitable for use in the block diagram of FIG. 2;

DETAILED DESCRIPTION OF A PREFERRED EMBODIMENT OF THE INVENTION

Figure 1:
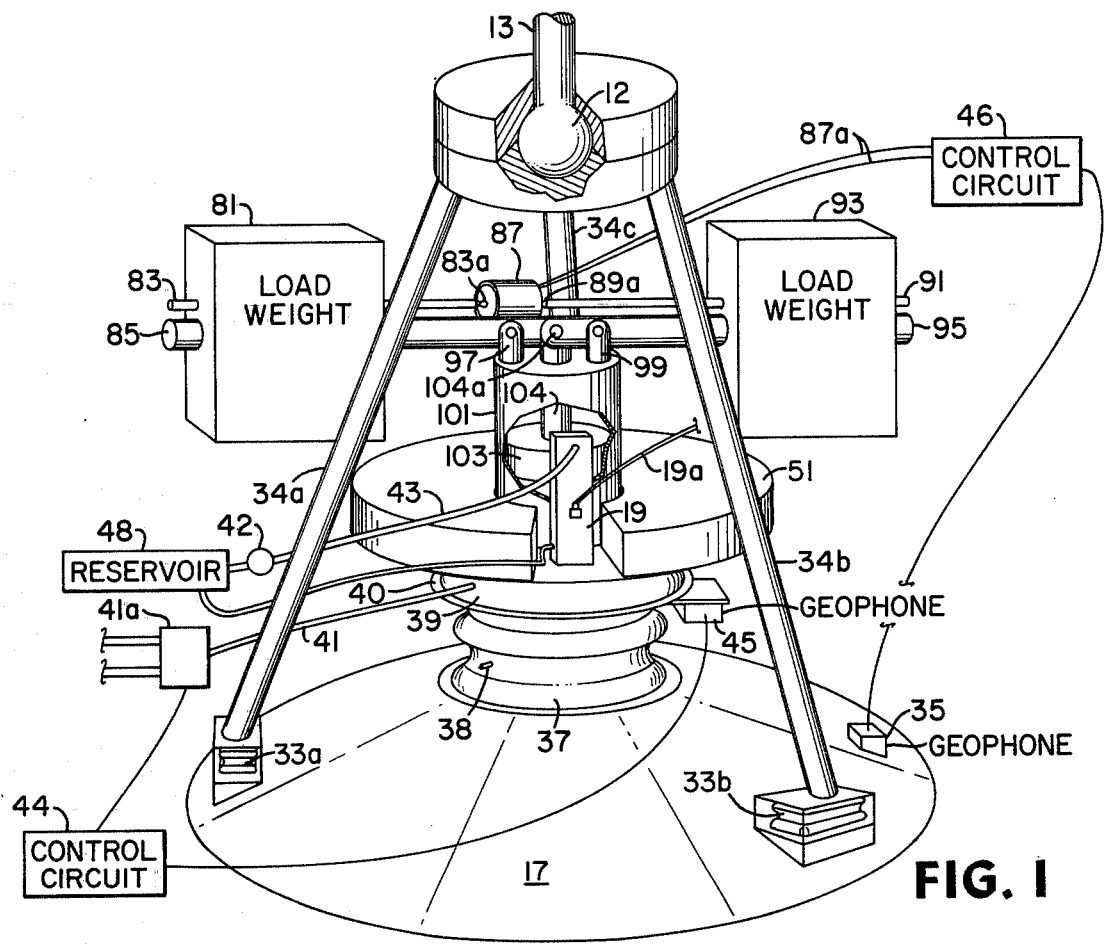
FIG. 1 is a perspective view of one embodiment of the invention.
Figure 1A:
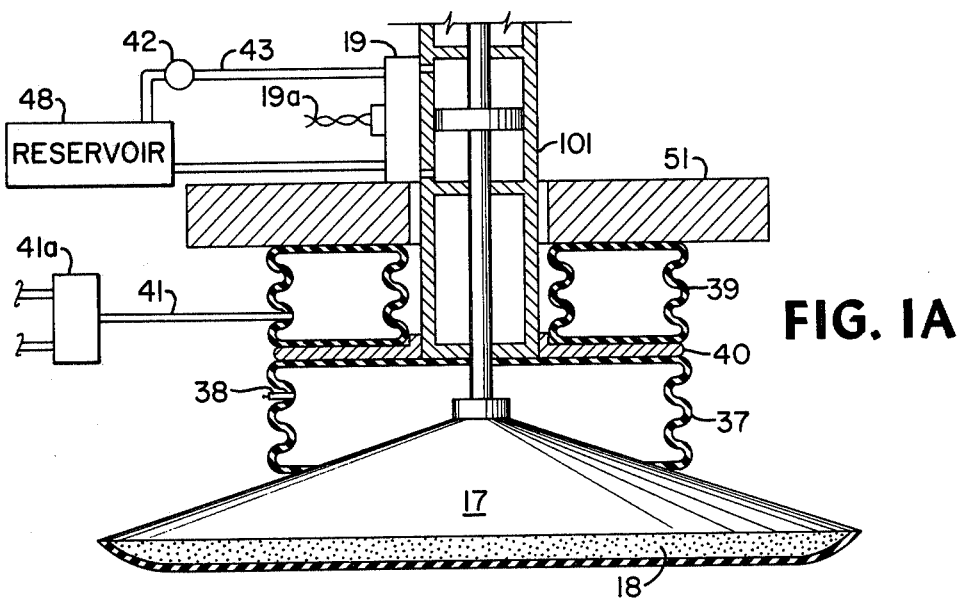
FIG. 1A is a view, partially in cross section, better illustrating a portion of the apparatus of FIG. 1.

With reference now to FIG. 1, there is illustrated an embodiment of an earth vibrator constructed in accordance with the invention. There is shown an earth vibrator including a base plate 17 which may be coupled to the earth either directly or through a sand filled bag 18 (see FIG. 1A) in the manner illustrated and described in U.S. Pat. No. 3,363,720 — J. F. Mifsud et al. The base plate is connected to a hydraulic drive mechanism comprising a cylinder 101, a driving piston 103 within the cylinder 101, and a drive shaft 104 carrying piston 103. The drive shaft is connected to the base plate at one end thereof and to two load weight shafts 85 and 95 at the other end thereof by a pivot mechanism 104a. The load weights 81 and 93 are slidably connected on shafts 85 and 95 respectively and are positioned thereon by means of screw threaded shafts 83 and 91 which engage screw threaded bores within the load weights 81 and 93 respectively. The screw threaded shafts 83 and 91 are rotatably driven by swivel connections 83a and 89a on a DC drive motor 87. As the motor 87 rotates in one direction or the other, the load weights are either slid toward the pivot connection 104a or away from the pivot connection in accordance with the direction of rotation of the motor 87. The purpose of the load weights will be discussed below. The shafts or lever arms 85 and 95 are pivotally supported by means of fulcrum members 97 and 99 which are connected to and supported by the cylinder 101.

For the purpose of imparting up-and-down vibratory motion to the piston 103, there is provided a servo valve member 19, the construction of which may be substantially the same as that of a similar device described in the above referenced U.S. Pat. No. 3,363,720. Briefly, the servo valve is reciprocably moved in accordance with the amplitude and polarity of an electrical input control signal applied thereto through electrical leads 19a. Hydraulic actuating power for the servo valve is supplied through conduit 43 from an external hydraulic power source including pump 42 and reservoir 48 (see FIG. 1A). Servo valves for this purpose are well known in the art as evidenced by the above U.S. Pat. No. 3,363,720 and will not be discussed further herein, except to say that their function is to apply hydraulic power to one side or the other of piston 103 in accordance with the magnitude and polarity of the electrical signal applied to electrical leads 19a.

For the current and usual design of ground vibrators the reaction impedance is furnished by rigidly attaching a mass to the hydraulic cylinder (or piston, depending on which is attached to the ground coupling plate). In the new design described herein, the reaction mass is coupled to the hydraulic cylinder 101 by means of air spring 39. Annular plate 40 is welded or otherwise connected to hydraulic cylinder 101 and air spring 39 is attached to the annular plate. The reaction mass 51 and air spring 39 essentially surround the hydraulic cylinder 101. During operation of the vibrator, the stiffness of the air spring is automatically adjusted so that the impedance of the spring resonates with the impedance of the reaction mass 51 and thus generates a large reaction impedance to reduce the motion of the hydraulic cylinder 101 to a minimum.

The weight of the hydraulic cylinder and everything that is connected to it is supported by air spring 37, which is attached at the top thereof to plate 40 and at the bottom thereof to the coupling plate 17. Air spring 37 is an isolation spring that sets the average position of the hydraulic piston 103 in the middle of the hydraulic cylinder in order to insure more linear operation of the hydraulic servo valve.

Figure 4:
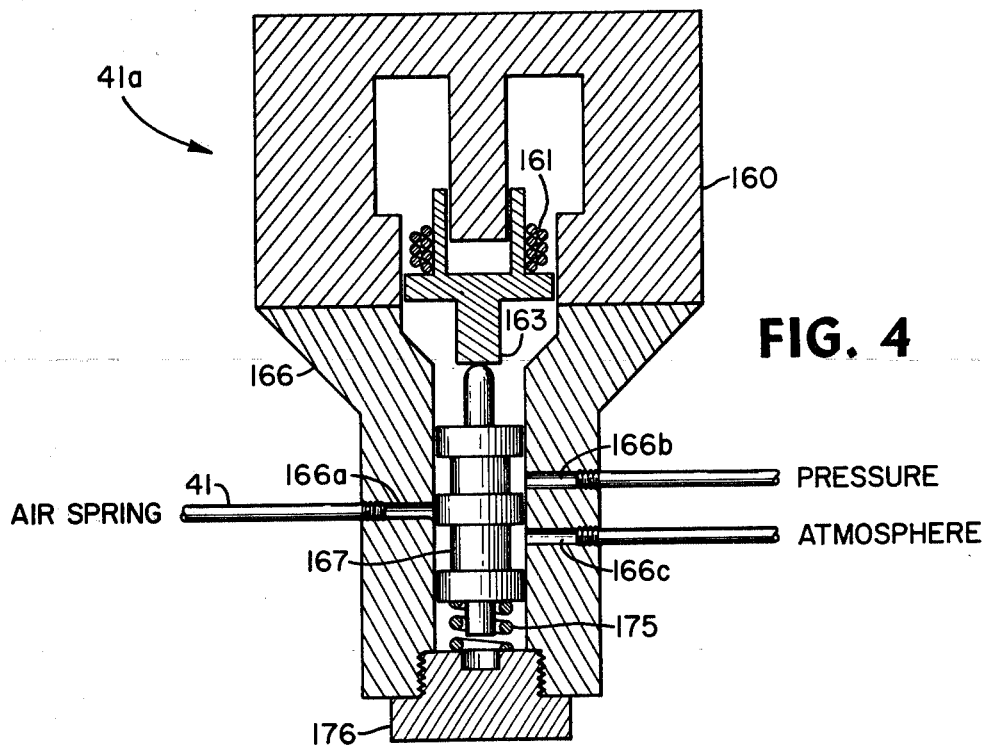
FIG. 4 is a schematic diagram of a pneumatic valve for use in the circuit of FIG. 2.

A vibratory pickup 45, such as a geophone, is connected to plate 40, which is attached to the hydraulic cylinder 101. Connected to the base plate 17 is another vibratory pickup 35, also typically a geophone. The function of the pickups 35 and 45 will become apparent below. For the purpose of inflating the air spring 39, there is provided a pneumatic line 41 controlled by a pneumatic valve 41a, the details of which are illustrated in FIG. 4 and described below. The air spring 37 is inflated to a desired pressure through a check valve, such as Shroeder valve 38.

Figure 5:
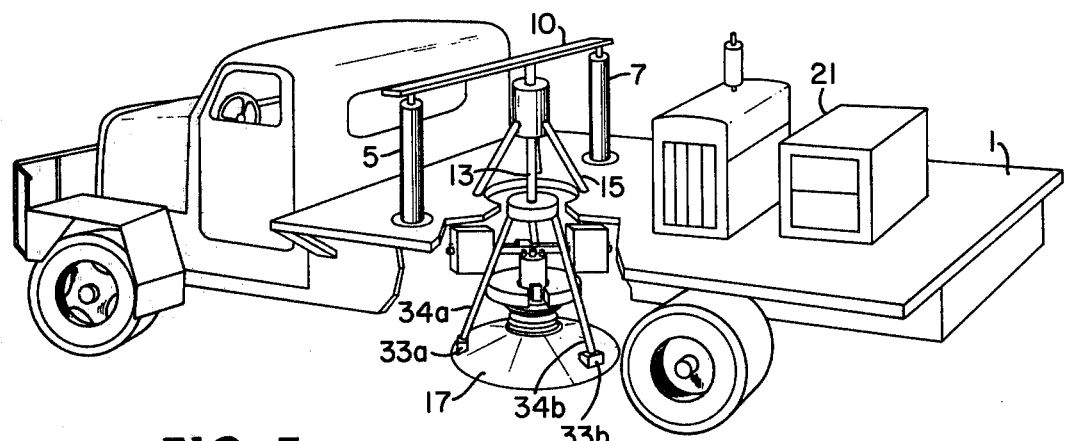
FIG. 5 is a perspective view of a truck whereon is mounted apparatus in accordance with the embodiments of FIGS. 1 and 1A.

The structure described above is vertically positioned by means of a tripod mechanism comprising three equally spaced posts or legs 34a, 34b, and 34c connected to a vertical shaft 13 by means of a ball joint suspension 12. The legs 34a, 34b, and 34c are respectivey connected to the base plate 17 by air spring connection members 33a, 33b, and 33c (the latter is not shown). The air springs may be of the type used on vibrators manufactured by the Geospace Company of Houston, Texas, or the Mertz Machine Company of Ponca City, Oklahoma. As illustrated in FIG. 5, the shaft 13 is connected to a horizontal beam 10 which is vertically positioned by hydraulic rams 5 and 7. The shaft 13 is held in place vertically by a sleeve bearing supported by members 15. The hydraulic rams 5 and 7 are supported on the bed of a truck 1 and are hydraulically actuated from a hydraulic power supply 21. Air springs 33a, 33b, and 33c are of very large compliance so that the structure supported thereby remains substantially motionless while base plate 17 is vibrating. The weight of the truck supported by air springs 33a, 33b, 33c, aids in holding the base plate 17 against the ground at all times during vibration thereof. Generally speaking, at low frequencies (below about 20 Hz) the weight of the total hold down mass (the truck and the reaction mass) plus the weight of the vibratory members should be greater than the upward components of the forces generated by the vibrator. As the frequencies increase above about 20 Hz a progressively smaller downward force can be tolerated.

The output from pickup 45 is coupled to a pneumatic valve 41a controlling the pneumatic line leading to the air spring 39, through a control circuit 44. Likewise the output of pickup 35 is connected to the electric motor power leads 87a through a control circuit 46 so as to supply direct current power of desired polarity to the motor 87. The constructional details of the circuits 44 and 46 will be described below.

Refer now to FIG. 2 wherein it is shown a circuit suitable for use as circuit components 44 and 46 in FIG. 1. Assuming that the circuit is substituted in the block 44 of FIG. 1, the output of geophone 45 is applied to terminal 131 of rectifier 133. The electrical signal that is applied to lines 19a to control electrohydraulic servo valve 19 also is applied to the input terminal means 137 of rectifier 139. The rectifiers 133 and 139 may be conventional rectifiers well known to the art, such as half-wave or full-wave semiconductor rectifying circuits. Both circuits are applied to a dividing circuit 135 the function of which is to produce an output signal indicative of the ratio of the amplitude of the signal applied to terminal 131 to the amplitude of the signal applied to terminal 137. The purpose of obtaining a signal indicative of such ratio is to generate a signal indicative of the ratio of cylinder motion to the amplitude of the electrical input control signal to the vibrator. The output signal of the dividing circuit 135 is applied to a time delay circuit 138 and to the plus (+) terminal of comparator 142.

The output from time delay circuit 138 is amplified by amplifier 140, and the amplifier 140 output is applied to the negative terminal of comparator 142. The gain of amplifier 140 should be selected so that the signal at its output is restored to essentially the same amplitude it had at the input to time delay circuit 138.

The output signal from time delay circuit 138 is also applied to the input of time delay circuit 138a which introduces an additional delay in the signal. The output of this time delay circuit is similarly amplified by amplifier 140a to restore the signal amplitude to the appropriate level. The output of amplifier 140a is similarly applied to the negative input of comparator 142a and the output from the time delay circuit 138 is applied to the plus input of comparator 142a. Comparators 142 and 142a may be standard devices such as the $\mu$A711 manufactured by Fairchild Semiconductor.

The comparator circuit generates a ONE logic level output signal when the input signal to the plus terminal is greater than the input signal to the negative terminal thereof and generates a ZERO logic level output signal when the input signal to the negative terminal is greater.

The output signal from comparator 142 is connected to the input of inverter 144 and to terminal $T_5$ of switch S1. The output signal from comparator 142a is connected to the input of inverter 144a and to terminal $T_2$ of switch S1. The output of inverter 144 is connected to terminal $T_6$ of switch S1 and the output of inverter 144a is connected to terminal $T_3$ of switch S1. Terminals $T_4$ and $T_1$ of switch S1 are connected respectively to input terminals 121 and 115 of switching circuit 143 (see FIG. 3).

When the circuits of FIGS. 2 and 3 are utilized in control circuit 44, switch S1 which may be a conventional double pole, double throw switch, is switched to the position connecting terminal $T_4$ to terminal $T_5$ and terminal $T_1$ to terminal $T_2$. When utilized in control circuit 46 S1 is switched, connecting terminal $T_4$ to terminal $T_6$, and terminal $T_1$ to terminal $T_3$.

The output signal from switching circuit 143 is amplified by amplifier 149 and the output signal from the amplifier 149 controls a pneumatic valve 41a which can function either to couple the air spring 39 to a source of pneumatic pressure or to the atmosphere depending upon the sense of the electrical signal applied to the pneumatic valve from the amplifier 149.

When the circuit of FIG. 2 is utilized to control the operation of motor 87 from pickup 35 the output of the amplifier 149 is used to control the direction of rotation of the electric motor. If need be, the amplifier 149 may control a switch coupling a direct current source to the motor, the switch being connected so as to apply to the motor a voltage of one polarity when the output of the amplifier 149 is of a given polarity and to apply a voltage of the other polarity when the output signal of the amplifier is reversed in polarity. This is a technique well known to the art and will not be discussed further herein.

The switching circuit that determines whether pressure is to be increased or decreased in the air spring is shown in FIG. 3. An output signal from comparator circuit 142 corresponding to a ONE logic level at a time $t_o$ indicates that the vibrator cylinder motion has increased relative to the vibrator input control signal amplitude during the preceding time interval, $t_o-t_1$, equal to the delay of time delay circuit 138. A ONE level output signal from comparator circuit 142a at time $t_o$ indicates that vibrator cylinder motion had increased relative to the vibrator input control signal amplitude during the earlier time interval, $t_1-t_2$. The interval $t_1-t_2$ is equal to the delay in time delay network 138a.

The purpose of the switching circuit is to apply a voltage of a given polarity to output terminal 117 when it is desired to increase pressure in the air spring and a voltage of opposite polarity to terminal 117 when it is desired to decrease pressure in the air spring. Either a positive or negative voltage will be applied to output terminal 117 depending on the state of flip-flop 109. The state of flip-flop 109 is initially set by applying the appropriate logic state to either the "S" (set) or "R" (reset) terminal of the flip-flop. Flip-flop 109 may be a standard device such as one half of an RCA CD4013. If a ONE logic state signal is initially applied to the S terminal, the Q output terminal will go to a ONE state and the $\overline{Q}$ output terminal will go to a ZERO state. If a ONE logic state signal is applied to the R input terminal, the $\overline{Q}$ output terminal will go to a ONE and the Q output will go to a ZERO state.

The Q and $\overline{Q}$ terminals of flip-flop 109 are connected respectively to the control terminals of switches 113 and 111. Switches 111 and 113, which may be conventional semiconductor switches or relays, are operable so that a logical ONE level applied to the control terminal thereof causes the switch to close and a logical ZERO level causes the switch to open. After the state of flip-flop 109 is initially set via the "S" or "R" input terminals, a ZERO logical level signal should be maintained on those terminals during the vibrator operation. During vibrator operation, the state of the flip-flop will be controlled by the "C" (clock) input.

With S1 switched to the position for use in control circuit 44, the output signals from comparators 142 and 142a are connected to input terminals of AND gate 119. When the output signals from both comparator circuits go to a ONE logic level the AND gate output will make a transition from a ZERO to a ONE state. This transition will cause flip-flop 109 when connected as shown, with the $\overline{Q}$ terminal connected to the "D" terminal, to change states. If the Q terminal was initially at a ONE state, so as to close switch 113, then switch 113 will now open and switch 111 will close so that a negative voltage is now applied to output terminal 117. Resistors 110 and 114 have low resistance values and have been inserted to prevent momentary shorting of terminals 116 and 118 in the event switches 111 and 112 should both be momentarily closed.

In effect, the change in the output signal from dividing circuit 135 is sampled at two successive time intervals. During normal vibrator action, the vibrating frequency will be varied with time. The stiffness of the air spring will also be varied to maintain the impedance of the air spring and the reaction mass substantially at resonance. In some instances, the change in vibrating frequency may cause an increase in the ratio of cylinder motion to input control signal amplitude even though the stiffness of the spring is being varied in the appropriate direction. Requiring an increasing ratio signal during two successive time intervals prevents the control signal to pneumatic valve 41a from being switched due to such momentary fluctuations in the ratio signal, and gives the vibrator time to respond to a change in the feedback.

The operation of the apparatus described hereinabove is as follows. Let it be assumed that the vibrator plate has been positioned at a desired location on the earth's surface as in FIG. 5. Hydraulic pressure is then applied to the upper side of pistons in the hydraulic rams 5 and 7 so that the rear end of the truck 1 is lifted off the ground and the weight of the truck is applied to the base plate 17 of the vibrator through isolating springs 33a, 33b, and 33c, through the cross-bar 10, the shaft 13, and the tripod support members 34a, 34b, and 34c. Hydraulic pressure is applied to the vibrator through line 43 and an electrical input control signal is applied to the control valve 19 through electrical leads 19a, to control the hydraulic pressure on the opposite sides of piston 103. The frequency of the electrical input signal is normally decreased or increased slowly as a function of time. A vibratory signal is thus applied to plate 17 and transmitted into the ground. Pickup 45 will produce an output signal which is compared with the vibrator input control signal by means of dividing circuit 135 and applied to comparator 142 through time delay circuit 138 and amplifier 140. The output signal from dividing circuit 135 also is applied directly to comparator 142, so that the output signal of comparator 142 indicates whether the amplitude of the signal from circuit 135 has increased or decreased during the preceding time interval equal to the delay in circuit 138. The output signal from time delay circuit 138 is further delayed in time delay circuit 138a. The output from time delay circuit 138a is applied to comparator 142a through amplifier 140a. The output signal from time delay circuit 138 is also applied directly to comparator 142a, so that the output signal of comparator 142a is indicative of the change in the amplitude of the signal from circuit 135 during an earlier time interval.

The output signals from comparators 142 and 142a are applied to switching circuit 143 which produces an output signal that indicates whether the amplitude of the output signal from the geophone 45 is increasing or decreasing relative to the input control signal amplitude as the frequency of the inut signal to the vibrator is changed. If the output signal from geophone 45 is decreasing relative to the input control signal, and pneumatic valve 41a is permitting compressed air to flow into air spring 39, then the pneumatic valve will remain in that state, thereby further increasing the stiffness in air spring 39, until the output signal from geophone 45 begins to increase relative to the input control signal. When the signal begins to increase, this means that the spring has become too stiff and some of the air must be released.

Similarly, the direction of rotation of the motor 87 is controlled to move the weights 81 and 93 in or out to maximize the output signal from the pickup 35. The effective mass loading is changed by moving the weights 81 and 93 in or out, thereby decreasing or increasing the load lever arms that support these weights. Because of the way these lever arms are pivoted, relative motion between the hydraulic piston and cylinder can be exaggerated and hence large change in mass loading is achieved using relatively small masses.

A mathematical explanation of the operation of air spring 39 and the control apparatus associated therewith is as follows: The most efficient operation of the vibrator requires that the hydraulic cylinder 101 move very little and that the hydraulic piston 103 move a large amount. This means that the mechanical impedance looking from the cylinder 101 to the reaction mass 51 should be maximized. This mechanical impedance can be expressed by:

$$Z_1 = \frac{i\omega M_1(R_1 - iK_1/\omega)}{R_1 + i(\omega M_1 - K_1/\omega)}$$

where $M_1$ is the reaction mass, $K_1$ is a constant indicative of spring stiffness of spring 39, and $R_1$ is the equivalent resistance of spring 39.

The magnitude of $Z_1$ is at a maximum when the frequency, $\omega$, is equal to $\sqrt{K_1/M_1}$. This frequency is normally referred to as the resonant frequency, $\omega_o$.

In this situation:

$$Z_1 = \frac{\omega_0 M_1(\omega_0 M_1 + iR_1)}{R_1}$$

If $R_1 << \omega_0 M_1$

Then $Z_1 = \frac{\omega_0^2 M_1^2}{R_1} = \frac{K_1 M_1}{R_1}$

From the above, it can be readily appreciated that when the frequency changes, resonance can be maintained by changing the stiffness $K_1$ of the spring 39.

In FIG. 4 there is illustrated in schematic form an electromagnetic valve for controlling the flow of air into and out of the air spring 39 through line 41. The valve comprising a body member 166 having an annular bore within which is positioned a spool 167. The spool is biased by a spring 175 and adjustable nut 176 against a protrusion on a movable yoke 163 carrying an electrical coil 161 within an E-shaped magnet 160. The body member has three ports; port 166a leading to the air spring; port 166b leading to the source of air pressure, and port 166c leading to the atmosphere. When the coil 161 is energized in one sense, member 163 will be forced downwardly so that ports 166a and 166b are placed in fluid communication and pressure is applied to the air spring. When current in the opposite sense is applied to coil 161, the member 163 will be withdrawn into the magnet 160 and the spring 175 will push the spool 167 upwardly to place port 166a in fluid communication with port 166c so that the air spring will be vented to the atmosphere, thus lowering the pneumatic pressure within the spring.

I claim:

1. In a variable frequency seismic vibrator wherein seismic energy is coupled to the ground by means of a coupling plate, said coupling plate being reciprocably driven relative to a reaction impedance by the driving member of a piston and cylinder assembly including a piston member and a cylinder member, the improvement comprising:
   a reaction mass; and
   spring means coupling said reaction mass to the member of said piston and cylinder assembly other than the driving member; and
   means responsive to changes in the vibratory motion of said member of said piston and cylinder assembly other than the driving member for varying the stiffness of said spring means so as to maintain said vibratory motion substantially at a minimum.

2. The apparatus of claim 1 wherein said driving member is the piston and said coupling plate is connected to said piston by a rod means, and said reaction mass is coupled to said cylinder member by said spring means, and wherein reciprocating movement is imparted to said piston by an electrohydraulic servo valve responsive to an electrical input control signal.

3. The apparatus of claim 2 wherein said spring means comprises an air spring the stiffness of which is a function of the pneumatic pressure therein.

4. The apparatus of claim 3 wherein said means for automatically varying the stiffness of said spring means comprises:
   means for producing a first electrical signal indicative of cylinder motion;
   means for generating a second electrical signal indicative of whether the amplitude of said first electrical signal is increasing or decreasing relative to the electrical input control signal amplitude;
   means responsive to said second electrical signal when said signal indicates that said first electrical signal amplitude is increasing relative to the electrical input control signal amplitude for varying the stiffness of said air spring so as to reduce said cylinder motion.

5. In a seismic vibrator including a coupling plate adapted to couple seismic energy generated by the vibrator to the ground, a reaction mass, and a piston member and a cylinder member engaged in reciprocable relation, one of said members being coupled to said reaction mass and the other member being connected to said coupling plate, the improvement which comprises:
   spring means coupling the reaction mass to the said member which is not connected to said coupling plate;
   means for sensing the amplitude of vibratory motion of said member which is not connected to said coupling plate and generating a first electrical signal indicative thereof; and
   means responsive to said first electrical signal for varying the stiffness of said spring means to maintain the impedance presented to the vibrator by said reaction mass and said spring means substantially at resonance when a reciprocating relationship is established between said piston member and said cylinder member.

6. The apparatus of claim 5 wherein said coupling plate is connected to said piston member and said reaction mass is coupled to said cylinder member by said spring means.

7. The apparatus of claim 6 wherein said spring means comprises an air spring the stiffness of which is a function of the pneumatic pressure therein.

8. The apparatus of claim 6 wherein reciprocating movement is imparted to said piston member by a servo valve responsive to an electrical input control signal, and wherein said means for varying the stiffness of said spring means comprises:

valve means for alternatively coupling a source of pressurized fluid to said air spring or releasing fluid from said air spring; and control means responsive to said sensing means for controlling said valve means so as to substantially minimize said cylinder member motion.

9. The apparatus of claim 8 wherein said sensing means comprises a geophone coupled to said cylinder, said geophone generating said first electrical signal indicative of cylinder motion, and said control means comprises:

circuit means for comparing said first electrical signal to said electrical input control signal and generating a second electrical signal proportional to the ratio thereof;

circuit means for generating a third electrical signal indicating whether said second electrical signal has increased during a first selected time interval and during a second selected time interval prior to said first selected time interval; and circuit means responsive to said third electrical signal when said third electrical signal indicates that said second electrical signal has increased during both said time intervals for generating an electrical output signal to change the pressure in said air spring.

10. In a variable frequency seismic vibrator wherein seismic energy is coupled to the ground by means of a coupling plate said coupling plate being reciprocably driven relative to a reaction impedance by a piston and cylinder means, an improved apparatus for generating said reaction impedance comprising:

a reaction mass;

spring means coupling said reaction mass to said vibrator; and means for automatically varying the stiffness of said spring means as the vibrating frequency changes so as to maintain the impedance presented to the vibrator by said reaction mass and spring means substantially at a maximum.

11. The apparatus of claim 10 wherein said coupling plate is connected to said piston and said reaction mass is coupled to said cylinder by said spring means.

12. The apparatus of claim 11 wherein said spring means comprises an air spring the stiffness of which is a function of the pneumatic pressure therein.

13. The apparatus of claim 10 wherein said coupling plate is connected to said cylinder and said reaction mass is coupled to said piston by said spring means and said spring means comprises an air spring the stiffness of which is a function of the pneumatic pressure therein.

14. The apparatus of claim 12 wherein reciprocating movement is imparted to said piston member by a servo valve responsive to an electrical input control signal, and wherein said means for varying the stiffness of said spring means comprises:

means for producing a first electrical signal indicative of cylinder motion;

means for generating a second electrical signal indicative of whether the amplitude of said first electrical signal is increasing or decreasing relative to the electrical input control signal amplitude;

means responsive to said second electrical signal when said signal indicates that said first electrical signal amplitude is increasing relative to the electrical input control signal amplitude for varying the stiffness of said air spring so as to reduce said cylinder motion.

15. The apparatus of claim 13 wherein reciprocating movement is imparted to said cylinder member by a servo valve responsive to an electrical input control signal, and wherein said means for varying the stiffness of said spring means comprises:

means for producing a first electrical signal indicative of piston motion;

means for generating a second electrical signal indicative of whether the amplitude of said first electrical signal is increasing or decreasing relative to the electrical input control signal amplitude;

means responsive to said second electrical signal when said signal indicates that said first electrical signal amplitude is increasing relative to the electrical input control signal amplitude for varying the stiffness of said air spring so as to reduce said piston motion.

\* \* \* \* \*